No. 768,322. PATENTED AUG. 23, 1904.
H. ALTMAYER.
APPARATUS FOR CIRCULATION IN BOILERS.
APPLICATION FILED JUNE 3, 1903.
NO MODEL.

No. 768,322. Patented August 23, 1904.

UNITED STATES PATENT OFFICE.

HEINRICH ALTMAYER, OF MANNHEIM, GERMANY.

APPARATUS FOR CIRCULATION IN BOILERS.

SPECIFICATION forming part of Letters Patent No. 768,322, dated August 23, 1904.

Application filed June 3, 1903. Serial No. 159,975. (No model.)

*To all whom it may concern:*

Be it known that I, HEINRICH ALTMAYER, a subject of the German Emperor, residing and having my post-office address at O. F. No. 24 Mannheim, Germany, have invented certain new and useful Improvements in Apparatus for the Circulation of Water in Steam-Boilers, of which the following is a specification.

The objects of this invention are to cause a continuous circulation of the water in steam-boilers, so as to obtain an equalization of temperature, to more effectually utilize the heat of the furnace, and to prevent overheating and corrosions of the boiler.

My invention consists of a combination of known apparatus, the arrangement thereof according to my invention acting both by suction and pressure to effect the circulation of the water.

According to my invention the apparatus is arranged so that in one part of the boiler the cold water is drawn from the bottom toward the surface of the water, while in another part the heated water in the upper part of the boiler is forced toward the colder part.

Two apparatus arranged according to my invention consist each of two funnels one above the other and united at their narrower ends, the upper funnel being smaller than the lower one. Projecting centrally into the lower and larger funnel is a pipe open at both ends and extending downward to near the bottom of the boiler. The sucking working of apparatus of this kind is well known, and the suction apparatus is according to my invention arranged in that part of the boiler where the evaporation is most active, the upper funnel being below the highest water-level. The steam which ascends through the water enters the lower funnel and as it reaches the narrow part thereof causes eddies and by expanding exerts a suction action in the central pipe, the contents of which are in consequence caused to ascend. A similar apparatus is arranged at that part of the boiler where the least evaporation takes place—for instance, in the neighborhood of the smoke-box, as in locomotives, portable engines, and marine boilers and the like. The upper edge of the upper funnel in this apparatus being arranged above the highest water-level, the particles of steam which ascend through the water at this part of the boiler with moderate velocity cause the water contained in the upper funnel to be forced downward through the central pipe toward the bottom of the boiler.

Figure 1:
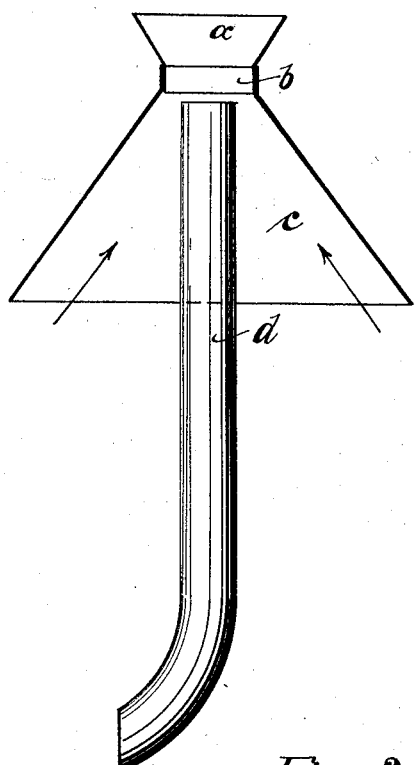
Figure 2:
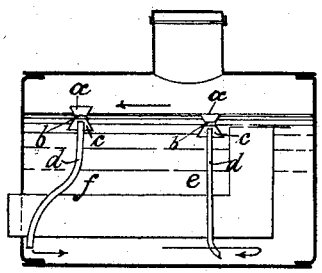

In the accompanying drawings, Figure 1 is a vertical central section of the two-funnel apparatus used in the process and arrangement according to my invention, and Fig. 2 is a sectional view of the general arrangement, forming the object of my said invention as applied to a steamer-boiler.

*a* is the upper smaller funnel, *b* is the uniting part of the two funnels, and *c* the lower larger funnel.

*d* is the pipe projecting centrally into the lower and larger funnel, open at both ends and extending downward to near the bottom of the boiler.

In Fig. 2 two apparatus *e* and *f* of the kind represented in Fig. 1 are arranged in a steamer-boiler. In the first apparatus, *e*, in which the upper funnel is not above the highest water-level of the boiler, a suction takes place in the well-known manner described, for instance, in my German Patent No. 123,172, while in the second apparatus, *f*, the upper funnel of which is above the water-level of the boiler, a down pressure of the hot water takes place. The central pipes *d* of the two apparatus are preferably bent at their lower ends, as shown.

Having now described the nature of my invention, I wish it to be understood that I do not claim the two-funnel apparatus represented in Fig. 1, as this apparatus is well known; but

What I claim is—

In a steam-boiler, the combination with an apparatus comprising two funnels arranged one above the other and a central tube open at both ends and projecting from the interior of the lower funnel to a point near the bottom of the boiler, said apparatus being located at a point where the evaporation is most active and having its upper funnel below the water-level of the boiler, of a similar apparatus located at a point where least evaporation takes place and having its upper funnel extending above the highest water-level of the boiler, substantially as described.

In testimony whereof I have signed my name to this specification in the presence of two subscribing witnesses.

HEINRICH ALTMAYER.

Witnesses:
 JACOB ADRIAN,
 GUSTAV L. LICHTENBERGER.